United States Patent
Jung

(10) Patent No.: US 9,304,532 B2
(45) Date of Patent: Apr. 5, 2016

(54) RECEIVER CIRCUIT FOR CORRECTING SKEW, SEMICONDUCTOR APPARATUS AND SYSTEM INCLUDING THE SAME

(71) Applicant: SK hynix Inc., Icheon-si Gyeonggi-do (KR)

(72) Inventor: Inhwa Jung, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 231 days.

(21) Appl. No.: 14/244,010

(22) Filed: Apr. 3, 2014

(65) Prior Publication Data
US 2015/0185758 A1    Jul. 2, 2015

(30) Foreign Application Priority Data
Dec. 30, 2013   (KR) .................. 10-2013-0166553

(51) Int. Cl.
*G06F 1/10*    (2006.01)
*G06F 1/12*    (2006.01)

(52) U.S. Cl.
CPC ... *G06F 1/10* (2013.01); *G06F 1/12* (2013.01)

(58) Field of Classification Search
CPC ..................................... G06F 1/10; G06F 1/12
See application file for complete search history.

(56) References Cited

U.S. PATENT DOCUMENTS

| | | | | |
|---|---|---|---|---|
| 6,647,506 B1* | 11/2003 | Yang | .......................... | G06F 1/10 370/503 |
| 7,043,657 B1* | 5/2006 | Yang | .......................... | G06F 1/10 711/167 |
| 7,593,498 B2* | 9/2009 | Dai | .......................... | H03K 5/135 375/371 |
| 7,720,105 B2* | 5/2010 | Colmant | ............... | H04L 49/153 370/389 |
| 8,035,435 B1* | 10/2011 | Shringarpure | ......... | H03K 5/135 327/147 |
| 8,050,372 B2 | 11/2011 | Lee | | |
| 2006/0251124 A1* | 11/2006 | Colmant | ............... | H04L 49/153 370/503 |

FOREIGN PATENT DOCUMENTS

KR    1020080044543 A    5/2008

\* cited by examiner

*Primary Examiner* — M Elamin
(74) *Attorney, Agent, or Firm* — William Park & Associates Ltd.

(57) ABSTRACT

A receiver circuit includes a deserialization unit, a sampling clock control unit and a sampling clock generation unit. The deserialization unit is configured to receive sampling clock signals, sample a plurality of input data signals, and generate a plurality of internal data signals. The sampling clock control unit is configured to generate a delay control signal and a synchronization completion signal in response to the plurality of internal data signals and a first group of clock signals. The sampling clock generation unit delays the first group of clock signals and provides the delayed first group of clock signals as the sampling clock signals in response to the delay control signal, and provides a second group of clock signals having a phase leading by a predetermined amount with respect to the first group of clock signals, as the sampling clock signals in response to the synchronization completion signal.

14 Claims, 6 Drawing Sheets

RECEIVER CIRCUIT FOR CORRECTING SKEW, SEMICONDUCTOR APPARATUS AND SYSTEM INCLUDING THE SAME

CROSS-REFERENCES TO RELATED APPLICATION

The present application claims priority under 35 U.S.C. §119(a) to Korean application number 10-2013-0166553, filed on Dec. 30, 2013 in the Korean Intellectual Property Office, which is incorporated herein by reference in its entirety as set forth in full.

BACKGROUND

1. Technical Field

Various embodiments relate to a semiconductor apparatus, and more particularly, to a semiconductor system including a master device and a slave device.

2. Related Art

Semiconductor systems often include a master device and a slave device. The master device may operate the slave device by providing control signals to the slave device. The slave device may store information received from the master device or output stored information under the control of the master device. The information may be data.

Referring to FIG. 1, a block diagram representation of a prior art semiconductor system 10 is shown. The semiconductor system 10 includes a master device 11 and a slave device 12. The master device 11 may transmit a plurality of signals to the slave device 12. The master device 11 may provide a command signal CMD, an address signal ADD, and a clock signal CLK to the slave device 12. The master device 11 may transmit data DQ0-DQn to be stored at the slave device 12 and may receive data DQ0-DQn from the slave device 12.

The data DQ0-DQn may be transmitted via a plurality of data buses that communicatively couple the master device 11 to the slave device 12. The slave device 12 includes a plurality of pads and receiver circuits, where each pad and receiver circuit is communicatively coupled to an associated one of the plurality of data buses. The slave device 12 may receive data DQ0-DQn transmitted via the plurality of data buses at the pads and receiver circuits in synchronization with the clock signal CLK. In many cases, when the data DQ0-DQn is transmitted from the master device 11 via the data buses at substantially the same time, the slave device 12 may not receive the data at substantially the same time. This may be due to a number of different circumstances, such as for example, a skew associated with the data buses, process variations associated with of the pads or process variations associated with the receiver circuits.

SUMMARY

In an embodiment, a receiver circuit may include a deserialization unit configured to receive sampling clock signals, sample a plurality of input data signals, and generate a plurality of internal data signals; a sampling clock control unit configured to generate a delay control signal and a synchronization completion signal in response to the plurality of internal data signals and a first group of clock signals; and a sampling clock generation unit configured to delay the first group of clock signals and provide the delayed first group of clock signals as the sampling clock signals in response to the delay control signal, and configured to provide a second group of clock signals having a phase leading by a predetermined amount with respect to the first group of clock signals, as the sampling clock signals in response to the synchronization completion signal.

In an embodiment, a method for correcting a skew in a semiconductor apparatus may include at a deserialization unit, receiving a first group of clock signals, sampling a plurality of input data signals, and generating a plurality of internal data signals, delaying the first group of clock signals and synchronizing edges of the plurality of input data signals with edges of the first group of clock signals in response to the plurality of internal data signals, providing a second group of clock signals having a phase leading by a predetermined amount with respect to the first group of clock signals, to the deserialization unit in response to the synchronization of the edges; and at the deserialization unit, receiving the second group of clock signals, sampling the plurality of input data signals, and generating the plurality of internal data signals.

DETAILED DESCRIPTION

Various embodiments of a semiconductor apparatus will be described below.

Figure 1:
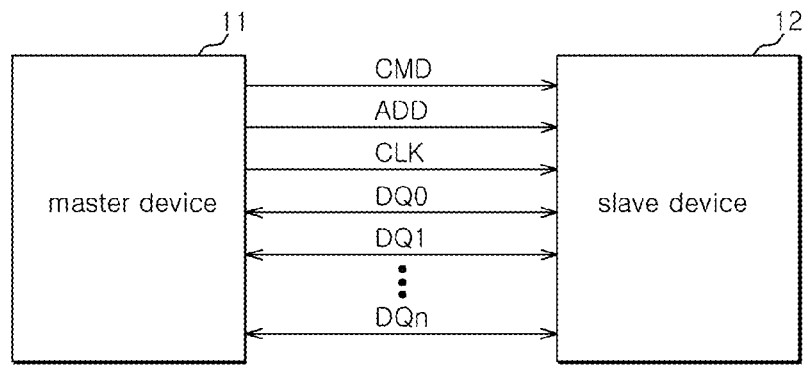
FIG. 1 is a block diagram representation of a prior art semiconductor system.
Figure 2:
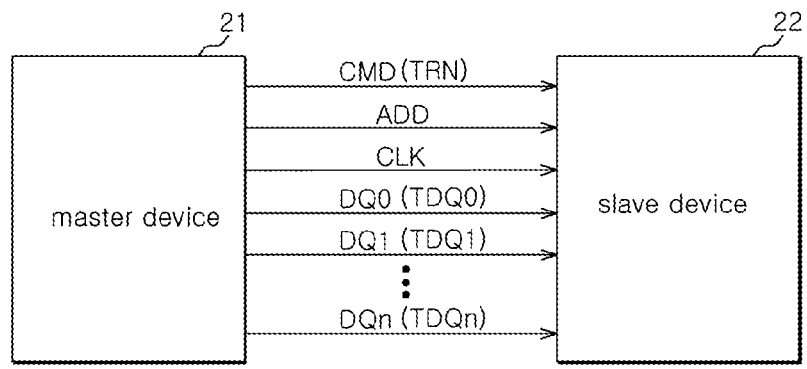
FIG. 2 is a block diagram representation of an embodiment of a semiconductor system.

Referring to FIG. 2, the semiconductor system 20 may include a master device 21 and a slave device 22. The master device 21 may manage the operation of the slave device 22 by transmitting a plurality of signals to the slave device 22. The master device 21 may transmit information to the slave device 22 and receive information from the slave device 22. The information may be a data. The master device 21 may transmit one or more control signals and the data in the form of data signals to the slave device 22 for storage at the slave device 22. The master device 21 may issue one or more control signals to the slave device 22 requesting data stored at the slave device 22 from the slave device 22.

The master device 21 and the slave device 22 may communicate via a plurality of buses. Examples of the plurality of buses may include, but is not limited to, a command bus, an address bus, a clock bus and a data bus. The master device 21 may provide a command signal CMD, an address signal ADD, a clock signal CLK, and data DQ0-DQn via one or more of the plurality of buses to the slave device 22 and the slave device 22 may responsively store the received data DQ0-DQn at the slave device 22. The master device 21 may request data DQ0-DQn from the slave device 22 by providing the command signal CMD, the address signal ADD, and the clock signal CLK to the slave device 22 via one or more of the plurality of buses. The slave device 22 receives the command signal CMD, the address signal ADD, and the clock signal CLK from the master device 21 and responsively transmits the requested data DQ0-DQn to the master device 22 via one or more of the plurality of buses.

The slave device 22 may receive the signals CMD, ADD and CLK from the master device 21 via a command bus, an address bus and a clock bus, respectively. The slave device 22 may receive data DQ0-DQn from the master device 21 via a plurality of data buses for storage at the slave device 22. The slave device 22 stores the received data DQ0-DQn in accordance with the command signal CMD, the address signal ADD and the clock signal CLK received from the master device 21. The slave device 22 may receive a request to transmit data DQ0-DQn stored at the slave device 22 from the master device 21. The slave device 22 may receive a command signal CMD, an address signal ADD and a clock signal CLK and retrieve data stored at the slave device 22 in accordance with the received command signal CMD, address signal ADD and clock signal CLK. The slave device 22 may transmit the retrieved data DQ0-DQn to the master device 21 via the plurality of data buses. The slave device 22 may include pads and receiver circuits and receive signals transmitted from the master device 21 via the pads and receiver circuits. The slave device 22 may include transceiver circuits and transmit signals to the master device 21 via the pads and the transceiver circuits.

The master device 21 may be a memory controller or a host device. Examples of the master device 21 may include, but are not limited to, a central processing unit (CPU), a graphic processing unit (GPU), a digital signal processor (DSP), one or more processor cores, a single core processor, a dual core processor, a multiple core processor, a microprocessor, a host processor, a controller, a plurality of processors or controllers, a chip, a microchip, a logic circuit, an integrated circuit (IC) and application-specific IC. The slave device 22 may be a memory apparatus. Examples of the memory apparatus may include, but are not limited to, a volatile random access memory apparatus and a non-volatile random access memory apparatus. An example of a volatile random access memory apparatus is a dynamic random access memory (DRAM). Examples of non-volatile random access memory apparatus include, but are not limited to, a phase change random access memory (PCRAM), a resistive random access memory (ReRAM), a ferroelectric random access memory (FeRAM), a magnetic random access memory (MRAM) and a spin transfer torque random access memory (STTRAM).

When power is supplied to the master device 21 and to the slave device 22, the master device 21 and the slave device 22 may perform a training operation. The training operation may be associated with data transmission. The training operation may be performed in order to compensate for a skew that may occur due to variations associated with one or more of the data bus the pads and the receiver circuits. The slave device 22 receives the data transmitted by the master device 21 in the form of data signals via the pad and the receiver. The training operation may be performed in order to compensate for a skew that may occur between the pads and receiver circuits. As a part of performing the training operation, the master device 21 may provide a training signal TRN having information about the training operation to the slave device 22. The training signal TRN may be a command signal CMD. The master device 21 may transmit training data TDQ0-TDQn in the form of training data signals, for use in the training operation to the slave device 22. The training data TDQ0-TDQn may be arbitrary data having a predetermined pattern. The slave device 22 may receive the training signal TRN and the training data TDQ0-TDQn from the master device 21.

Figure 3:
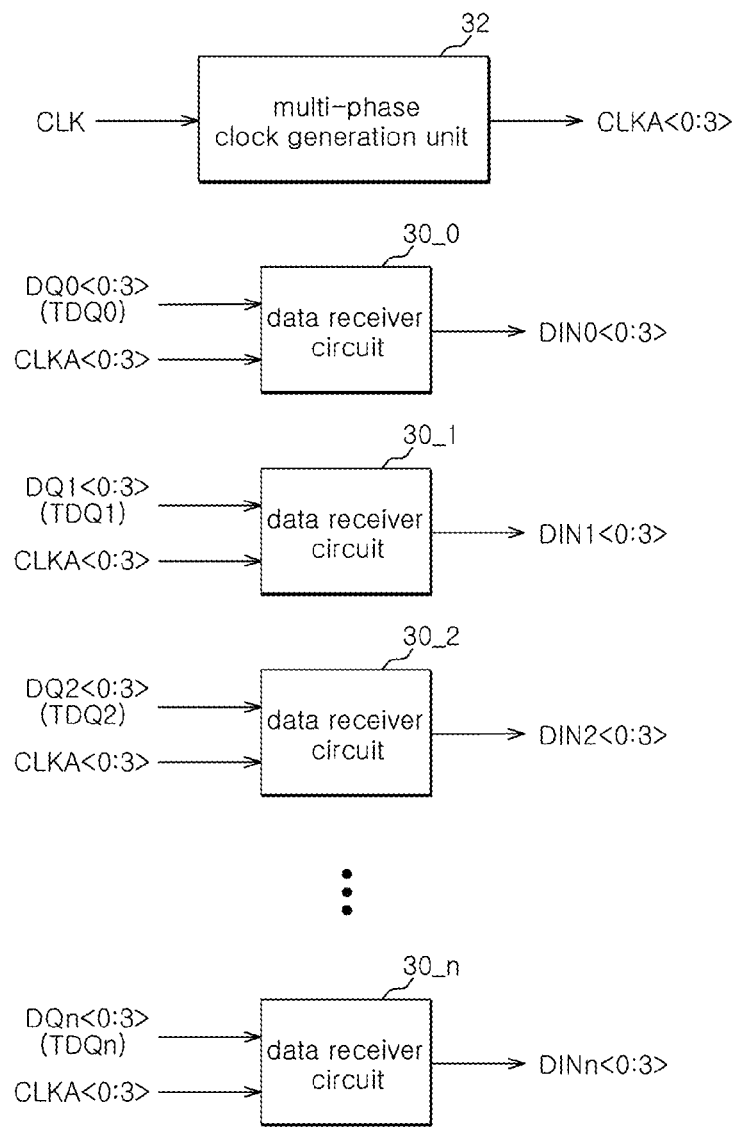
FIG. 3 is a block diagram representation of an of embodiment of a slave device shown in FIG. 2.

Referring to FIG. 3, the slave device 22 may include a plurality of data receiver circuits 30_0-30_$n$. Each data receiver circuit 30_0-30_$n$ is electrically coupled to an associated set of buses Each data receiver circuits 30_0-30_$n$ is electrically coupled to one or more associated pads (not shown). Each of the plurality of data receiver circuit 30_0$o$30_$n$ may receive data in the form of data signals DQ0<0:3>-DQn<0:3> transmitted from the master device 21 via the associated set of data buses and pad. During the training operation, the master device 21 may transmit the training data signals TDQ0-TDQn having a predetermined pattern that is substantially similar to the data signals DQ0<0:3>-DQn<0:3> to the slave device 22 via the data buses. The plurality of data receiver circuits 30_0-30_$n$ of the slave device 22 may perform the training operation by performing one or more of the steps associated with receiving the training data signals TDQ0-TDQn.

The slave device 22 may include a multi-phase clock generation unit 32. The multi-phase clock generation unit 32 may receive the clock signal CLK transmitted from the master device 21 via the clock bus. The multi-phase clock generation unit 32 may generate a first group of clock signals CLKA<0:3>. The first group of clock signals CLKA<0:3> may include clock signals that have a 90 degree, a 180 degree, and a 270 degree phase-delay with respect to the received clock signal CLK. The plurality of data receiver circuits 30_0-30_$n$ may receive the data signals DQ0<0:3>-DQn<0:3> via the plurality of data buses in response to the first group of clock signals CLKA<0:3>. For example, the data receiver 30_0 may receive the data signals DQ0<0:3> in response to the clock signal CLKA<0:3> via a data bus associated with the data receive 30_0. The master device 21 may sequentially transmit a plurality of data signals via the plurality of buses to the slave device 22. When the master device 21 sequentially transmits four data signals via each of the plurality of data buses, a total of 4*(n+1) data in the form of data signals DQ0<0:3>-DQn<0:3> may be transmitted to the slave device 22. The plurality of data receiver circuits 30_0-30_$n$ may sequentially receive the plurality of data signals in synchronization with the first group of clock signals CLKA<0:3>. The plurality of data receiver circuits 30_0-30_$n$ may receive the data signals DQ0<0:3>-DQn<0:3> transmitted via each data bus in synchronization with the first group of clock signals CLKA<0:3> and may output the received data as internal data signals DIN0<0:3>-DINn<0:3>.

During the training operation, the plurality of data receiver circuits 30_0-30_$n$ may receive the training data signals TDQ0-TDQn as the data signals DQ0<0:3>-DQn<0:3> via the plurality of data buses. The plurality of data receiver circuits 30_0-30_$n$ may delay the first group of clock signals CLKA<0:3> and receive the training data signals TDQ0-TDQn in synchronization with the delayed clock signals. The plurality of receiver circuits 30_0-30_$n$ may detect level changes of the training data signals TDQ0-TDQn in synchronization with the delayed clock signals and determine the delay amount of the first group of clock signals CLKA<0:3> based on the results of the detection. When the delay amount of the first group of clock signals CLKA<0:3> is determined, the plurality of data receiver circuits 30_0-30_$n$ may receive the data signals DQ0<0:3>-DQn<0:3> transmitted from the master device 21 at substantially the same time regardless of any skew that may be present. When the training operation is completed and a normal operation is initiated, the plurality of data receiver circuits 30_0-30_$n$ may receive the data signals DQ0<0:3>-DQn<0:3> transmitted via the data bus from the master device 21 in synchronization with the delayed clock signals. The delayed clocks signals may have phases corresponding to that of the first group of clock signals CLKA<0:3> that are delayed by the pre-determined delay amount. The plurality of data receiver circuits 30_0-30_n may output the received data as the internal data signals DIN0<0:3>-DINn<0:3>.

Figure 4:
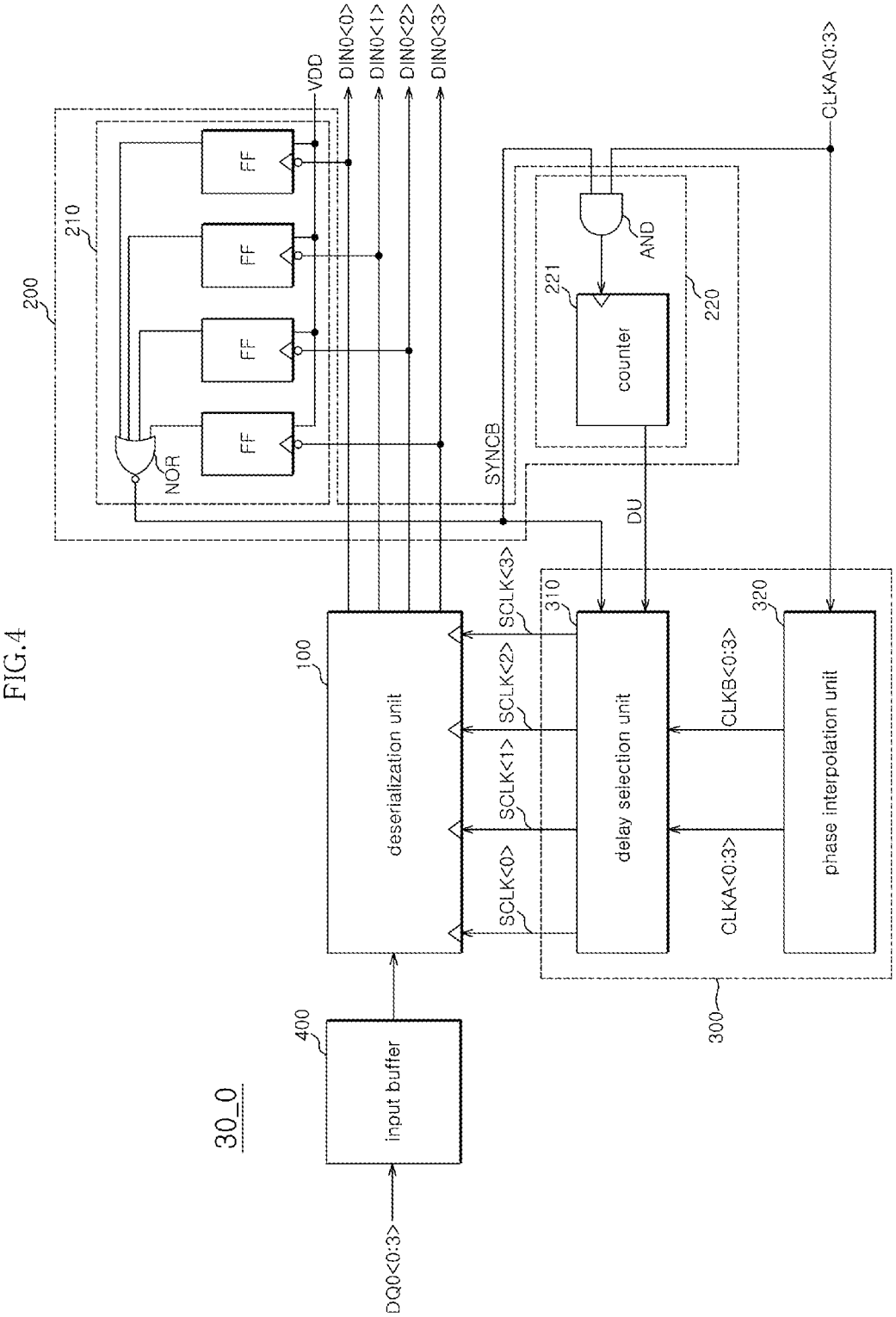
FIG. 4 is a block diagram representation of an embodiment of a receiver circuit shown in FIG. 3.

FIG. 4 is a block diagram representation of an embodiment of one of the plurality of data receiver circuits 30_0-30_n shown in FIG. 3. The first data receiver circuit 30_0, shown in FIG. 4, is substantially similar to the other data receiver circuits 30_1-30_n. The first data receiver circuit 30_0 may include a deserialization unit 100, a sampling clock control unit 200, a sampling clock generation unit 300 and an input buffer 400. The deserialization unit 100 may receive a plurality of input data signals DQ0<0:3> and sampling clock signals SCLK<0:3>. The deserialization unit 100 may sample the plurality of input data signals DQ0<0:3> using the sampling clock signals SCLK<0:3> and generate a plurality of internal data signals DIN0<0:3>. The clock signal may be used to sample the data signal according to an input order of the input data signals. The plurality of input data signals DQ0<0:3> may be data signals received via the input buffer 400 from the master device 21, or in the form of a serial data sequentially transmitted via a data bus. The input buffer 400 may buffer the plurality of input data signals DQ0<0:3> received from the master device 21. The plurality of internal data signals DIN0<0:3> generated by the deserialization unit 100 may be transmitted to internal circuits of the slave device 22 via a plurality of internal data buses within the slave device 22. The plurality of internal data signals DIN0<0:3> may be generated in the form of parallel data. The deserialization unit 100 may receive the first group of clock signals CLKA<0:3> as the sampling clock signals SCLK<0:3>, sample the plurality of input data signals DQ0<0:3>, and generate the plurality of internal data signals DIN0<0:3>. For example, when power is supplied to the master device 21 and to the slave device 22 and the training operation is performed, the slave device 22 may sample the plurality of input data signals DQ0<0:3> received from the master device 21 using the first group of clock signals CLKA<0:3>.

The sampling clock control unit 200 may adjust the sampling clock signals SCLK<0:3> based on the plurality of internal data signals DIN0<0:3> and the first group of clock signals CLKA<0:3>. The sampling clock control unit 200 may generate a delay control signal DU and a synchronization completion signal SYNCB in response to the plurality of internal data signals DIN0<0:3> and the first group of clock signals CLKA<0:3>. The sampling clock control unit 200 and may transmit the delay control signal DU and the synchronization completion signal SYNCB to the sampling clock generation unit 300.

The sampling clock control unit 200 may include a synchronization detection unit 210 and a delay control unit 220. The synchronization detection unit 210 may generate the synchronization completion signal SYNCB by detecting levels of the internal data signals DIN0<0:3>. When the training operation is performed, the master device 21 may transmit the input data signals DQ0<0:3> having a predetermined pattern, or the training data TDQ0 to the slave device 22. For example, one of the input data signals DQ0<0:3> may have a high level while the other input data signals DQ0<0:3> may have a low level. The synchronization detection unit 210 may enable the synchronization completion signal SYNCB when the synchronization detection unit 210 detects that all of the internal data signals DIN0<0:3>, generated through the sampling of the of input data signals DQ0<0:3> have the same level. For example, the synchronization detection unit 210 may enable the synchronization completion signal SYNCB when all of the internal data signals DIN0<0:3> have the low level. The synchronization detection unit 210 may enable the synchronization completion signal SYNCB when one of the edges of the internal data signals DIN0<0:3> and one of the edges of the first group of clock signals CLKA<0:3> are synchronized with respect to each other. One of the first group of clock signals CLKA<0:3> may be related to receiving one of the input data signals DQ0<0:3> and may be used to sample the one of the input data signals DQ0<0:3>. For example, when a first input data signal DQ0<0> of the input data signals DQ0<0:3> received from the master device 21 has a high level and the rest of the input data signals DQ0<0:3> have a low level, the synchronization detection unit 210 may generate the synchronization completion signal SYNCB when the edge of the first input data signal DQ0<0> and the edge of a first clock signal CLKA<0> of the first group of clock signals CLKA<0:3>, provided as the sampling clock signals SCLK<0> used for sampling the first input data signal DQ0<0> are synchronized with respect to each other. The synchronization detection unit 210 may enable the synchronization completion signal SYNCB when all of the internal data signals DIN0<0:3> have a low level. The synchronization completion signal SYNCB may be enabled when a falling edge of the first input data signal DQ0<0> of the plurality of input data signals DQ0<0:3> and a rising edge of the first clock signal CLKA<0> of the first group of clock signals CLKA<0:3> are synchronized with respect to each other.

The delay control unit 220 may generate the delay control signal DU based on the received synchronization completion signal SYNCB and the first group of clock signals CLKA<0:3>. The delay control unit 220 may generate the delay control signal DU in response to the first group of clock signals CLKA<0:3> until the synchronization completion signal SYNCB is enabled.

The sampling clock generation unit 300 may provide the sampling clock signals SCLK<0:3> to the deserialization unit 100 in response to the delay control signal DU and the synchronization completion signal SYNCB. The sampling clock generation unit 300 may delay the first group of clock signals CLKA<0:3> in response to the delay control signal DU, and output the delayed first group of clock signals as the sampling clock signals SCLK<0:3>. The sampling clock generation unit 300 may provide one of the delayed first group of clock signals CLKA<0:3> and a second group of clock signals CLKB<0:3> as the sampling clock signals SCLK<0:3> in response to the synchronization completion signal SYNCB. The sampling clock generation unit 300 may provide the first group of clock signals CLKA<0:3> and the delayed first group of clock signals as the sampling clock signals SCLK<0:3>. When the synchronization completion signal SYNCB is enabled, the sampling clock generation unit 300 may provide the second group of clock signals CLKB<0:3> as the sampling clock signals SCLK<0:3>. The second group of clock signals CLKB<0:3> may have a phase leading by a predetermined amount with respect to the phase of first group of clock signals CLKA<0:3>. The predetermined amount of phase may correspond to a window of the input data signals DQ0<0:3>. The sampling clock generation unit 300 may include a delay selection unit 310 configured to delay the first group of clock signals CLKA<0:3> in response to the delay control signal DU, and output one of the delayed first group of clock signals and the second group of clock signals CLKB<0:3> as the sampling clock signals SCLK<0:3> in response to the synchronization completion signal SYNCB.

The sampling clock generation unit 300 may include a phase interpolation unit 320. The phase interpolation unit 320 may generate the second group of clock signals CLKB<0:3> based on the first group of clock signals CLKA<0:3>. As described above, the second group of clock signals CLKB<0:3> may have a phase leading by the predetermined amount with respect to the phase of the first group of clock signals CLKA<0:3>. For example, when the window of a data signal corresponds to approximately one quarter of the period of the clock signal, the predetermined amount of phase may be approximately one eighth of the period of the clock signal and the phase interpolation unit 320 may generate the first group of clock signals CLKA<0:3> having phases of approximately 0, 90, 180 and 270 degrees and the second group of clock signals CLKB<0:3> having phases of approximately 315, 45, 135 and 225 degrees. The phase interpolation unit 320 may generate the second group of clock signals CLKB<0:3> by mixing the phases of the first group of clock signals CLKA<0:3>.

The synchronization detection unit 210 may include a plurality of flip-flops FF and a NOR gate NOR. The synchronization detection unit 210 may include the plurality of flip-flops FF, where the number of flip-flops FF may correspond to a number of internal data signals DIN0<0:3>. For example, in FIG. 4, there are four input data signals DQ0<0:3>, and four internal data signals DIN0<0:3>, and the synchronization detection unit 210 includes four flip-flops FF. Each of the plurality of flip-flops FF may receive a corresponding internal data signal DIN0<0:3>. Each of the plurality of flip-flops FF may receive a power voltage VDD at the input terminal and the corresponding internal data signal DIN0<0:3> at the clock terminal. Each of the plurality of flip-flops FF may output the power voltage VDD when the corresponding internal data signal DIN0<0:3> changes from a high level to a low level. The NOR gate NOR may generate the synchronization completion signal SYNCB in response to the outputs of the plurality of flip-flops FF. The NOR gate NOR may enable the synchronization completion signal SYNCB to a low level when one or more of the outputs of the plurality of flip-flops FF have a high level. For example, when the outputs of the plurality of flip-flops FF have a low level at first, and the NOR gate NOR may generate a disabled synchronization completion signal SYNCB having a high level. When one of the plurality of internal data signals DIN0<0:3> changes to a high level and then to a low level, the output of the corresponding one of the plurality of flip-flops FF may change to a high level and the NOR gate NOR may generate an enabled synchronization completion signal SYNCB having a low level.

The delay control unit 220 may include an AND gate AND and a counter 221. The AND gate AND may receive the synchronization completion signal SYNCB and the first group of clock signals CLKA<0:3> as inputs. The AND gate AND may transmit the first group of clock signals CLKA<0:3> to the counter 221 when the synchronization completion signal SYNCB is disabled and has a high level. The AND gate AND may block the transmission of the first group of clock signals CLKA<0:3> to the counter 221 when the synchronization completion signal SYNCB is enabled and has a low level. The counter 221 may generate the delay control signal DU in response to the first group of clock signals CLKA<0:3>. The delay control signal DU may have a plurality of bits and the counter 221 may increase a logic value of the delay control signal DU when a high pulse of the first group of clock signals CLKA<0:3> is received at the counter 221. As the logic value of the delay control signal DU increases, an amount of delay that the delay selection unit 310 may implement to delay the phase of the first group of clock signals CLKA<0:3> may increase.

Figure 5:
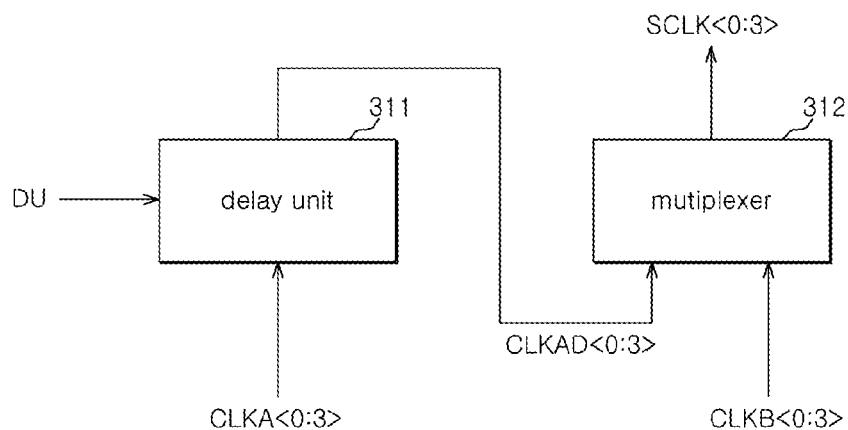
FIG. 5 is a block diagram representation of an embodiment of a delay selection unit shown in FIG. 4.

FIG. 5 is a block diagram representation of an example of the delay selection unit 310 shown in FIG. 4. The delay selection unit 310 may include a delay unit 311 and a multiplexer 312. The delay unit 311 may receive the first group of clock signals CLKA<0:3> and the delay control signal DU, and may delay the first group of clock signals CLKA<0:3> based on the value of the delay control signal DU. The delay unit 311 may include a plurality of unit delay cells (not shown). The delay unit 311 may increase a number of the unit delay cells that are turned on as the logic value of the delay control signal DU generated by the delay control unit 220 gradually increases. As logic value of the delay control signal DU increases, the amount of delay associated with delaying the first group of clock signals CLKA<0:3> may increase. The multiplexer 312 may receive the output from the delay unit 311 (where the output from the delay unit 311 is the delayed first group of clock signals CLKAD<0:3>), the second group of clock signals CLKB<0:3> and the synchronization completion signal SYNCB. The multiplexer 312 may output one of the output (where the output from the delay unit 311 is the delayed first group of clock signals CLKAD<0:3>) of the delay unit 311 and the second group of clock signals CLKB<0:3> as the sampling clock signals SCLK<0:3> in response to the synchronization completion signal SYNCB.

Figure 6:
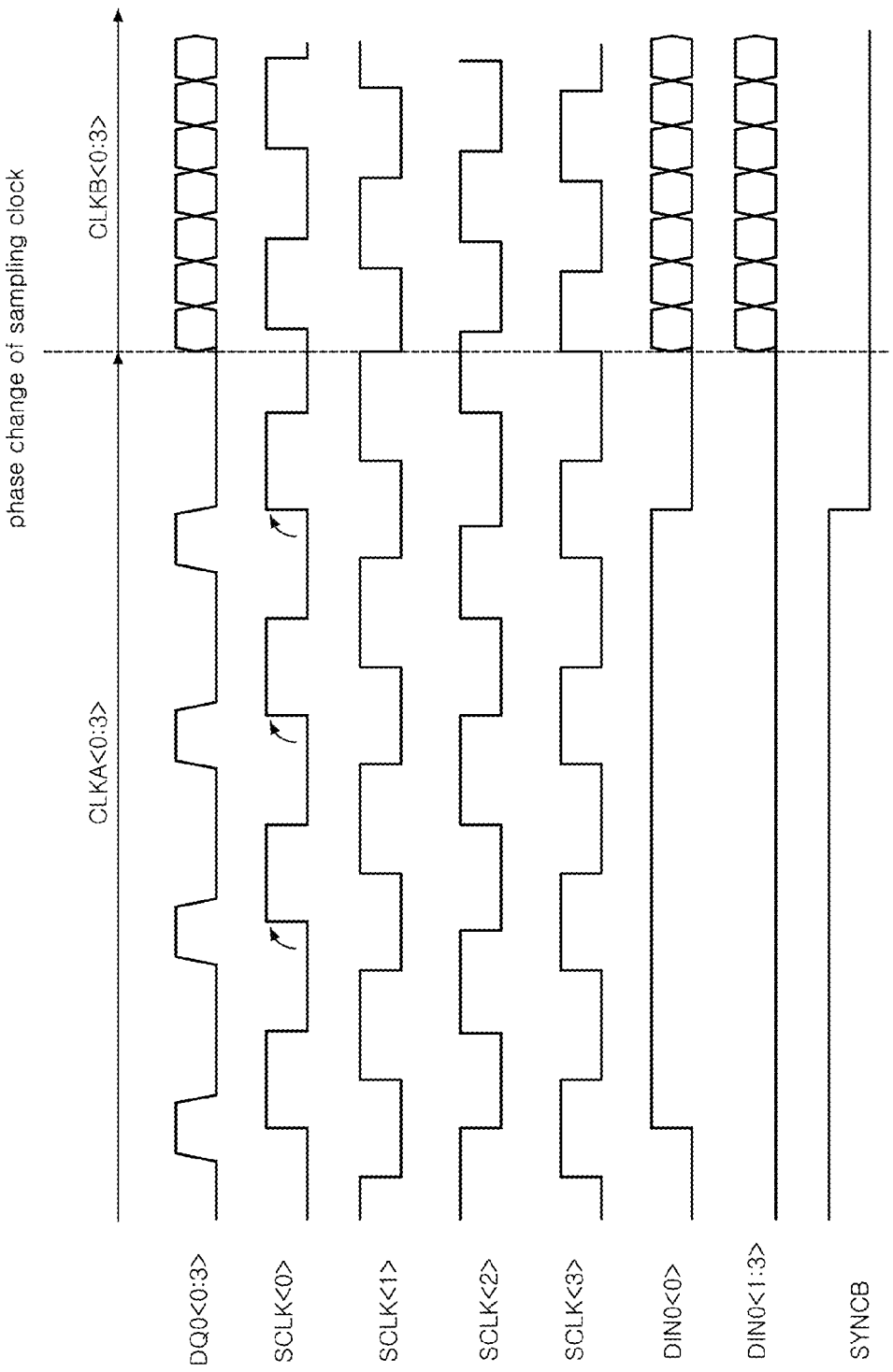
FIG. 6 is a timing diagram illustrating the timing associated with the operations of an embodiment of a receiver circuit of a semiconductor system.

FIG. 6 is a timing diagram illustrating the timing associated with the operations of an embodiment of a data receiver circuit 30_0. The timing of the operations of an embodiment of a data receiver circuit 30_0 and the semiconductor system 20 will be described below with reference to FIGS. 2 to 6. When the master device 21 and the slave device 22 are powered on, the master device 21 and the slave device 22, upon initialization, may perform the training operation for correcting the skew of the data receiver circuits 30_0 to 30_n of the slave device 22. During the training operation, the master device 21 may provide the clock signal CLK and the input data signals DQ0<0:3> having the predetermined pattern to the slave device 22. For example, the input data signals DQ0<0:3> may be in the form of serial data that is transmitted sequentially and have the logic values of 1, 0, 0, and 0. The master device 21 may provide the input data signals DQ0<0:3> to the slave device 22 on every period of the clock signal CLK.

The multi-phase clock generation unit 32 of the slave device 22 may generate the first group of clock signals CLKA<0:3> from the clock signal CLK. The deserialization unit 100 may receive the first group of clock signals CLKA<0:3> as the sampling clock signals SCLK<0:3>, sample the plurality of input data signals DQ0<0:3>, and generate the internal data signals DIN0<0:3>, where the values of the internal data signals DIN0<0:3> are 1, 0, 0, and 0. The synchronization detection unit 210 may maintain the disabled status of the synchronization completion signal SYNCB, the delay control unit 220 may delay the first group of clock signals CLKA<0:3> by the amount of a unit time period, and the delay selection unit 310 may generate the delayed first group of clock signals CLKAD<0:3> as the sampling clock signals SCLK<0:3>.

The deserialization unit 100 may sample the input data signals DQ0<0:3> in synchronization with the delayed first group of clock signals CLKAD<0:3>. The arrows in FIG. 6 indicate that a timing for sampling the input data signals DQ0<0:3> is delayed as the first group of clock signals CLKA<0:3>, which is sequentially delayed, is generated as the sampling clock signals SCLK<0:3>. When the first group of clock signals CLKA<0:3> is delayed, the falling edge of the first data signal DQ0<0> from among the input data signals DQ0<0:3> and the rising edge of the first clock signals SCLK<0> from among the first group of clock signals CLKA<0:3> are synchronized with respect to each other, and the deserialization unit 100 may generate the plurality of internal data signals DIN0<0:3> having the logic values of 0, 0, 0, and 0. The synchronization detection unit 210 may detect the transition of the first internal data signal DIN0<0> of the internal data signals DIN0<0:3> from the high level to the low level, and enable the synchronization completion signal SYNCB to the low level. When the synchronization completion signal SYNCB is enabled, the delay control unit 220 may not increase the logic value of the delay control signal DU and the multiplexer 312 may provide the second group of clock signals CLKB<0:3> as the sampling clock signals SCLK<0: 3>.

When the training operation has been completed and the normal operation begins, the deserialization unit 100 may sample the input data signals DQ0<0:3> received from the master device 21 according to the second group of clock signals CLKB<0:3>. The data receiver circuits 30_0 to 30_n may sample the input data signals DQ0<0:3> at the center of the input data signals DQ0<0:3> received from the master device 21. The data receiver circuit 30_0 may generally align the rising edge of the second group of clock signals CLKB<0: 3> to the center of the input data signals DQ0<0:3> by delaying the first group of clock signals CLKA<0:3> (where the delayed the first group of clock signals CLKA<0:3> is used as the sampling clock signals SCLK<0:3>) to the falling edge of the input data signals DQ0<0:3> and using the second group of clock signals CLKB<0:3> that may have a leading phase of approximately a half of the window of the input data signals DQ0<0:3>, as the sampling clock signals SCLK<0:3>.

The data receiver circuits 30_1-30_n of the slave device 22 may perform substantially the same training operation as the receiver circuit 30_0. The data receiver circuits 30_0-30_n may sample the input data signals DQ0<0:3>-DQn<0:3> at approximately the same timing, and generate the internal data signals DIN0<0:3>-DINn<0:3>, respectively. This may result in the skew that may occur in the pad and the receiver circuit being corrected.

Figure 7:
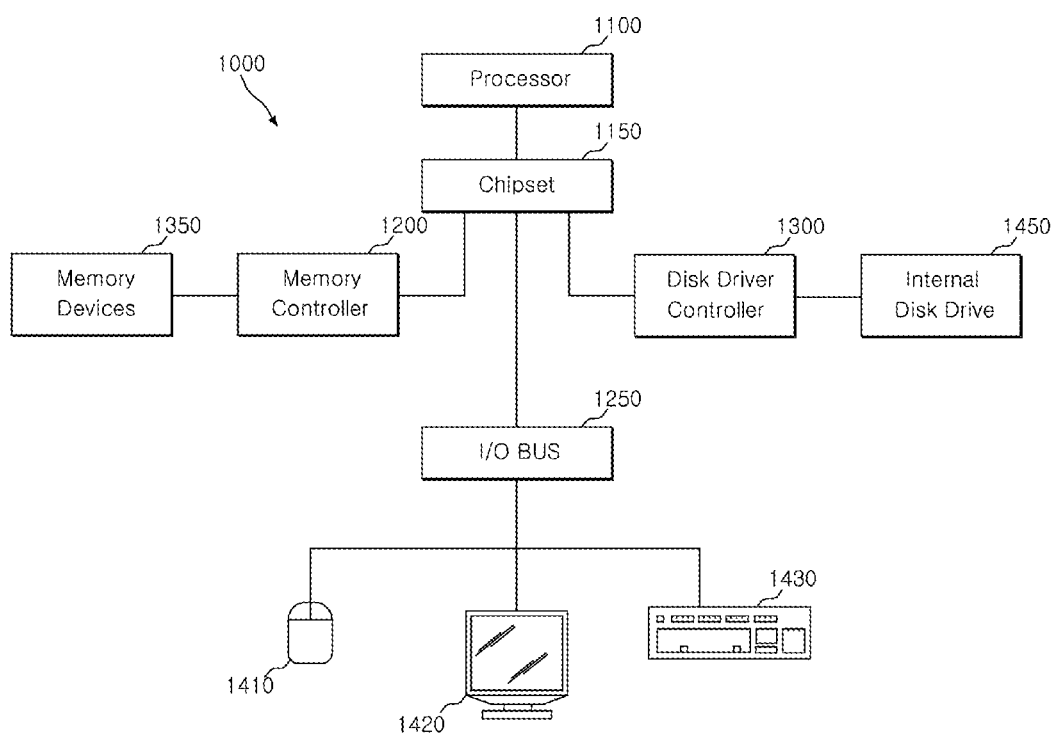
FIG. 7 is a block diagram representation of system including an embodiment of a semiconductor apparatus.

Referring to FIG. 7, a block diagram representation of a system 1000 including an embodiment of a semiconductor apparatus 1350 is shown. In an embodiment the memory controller 1200 is the master device 21 and the semiconductor memory device 1350 is the slave device 22. In an embodiment, the semiconductor memory device 1350 includes an embodiment of the receiver circuit.

In an embodiment, the system includes a memory controller 1200 and a semiconductor memory device 1350. The semiconductor memory device 1350 includes a receiver circuit. The receiver circuit includes a deserialization unit 100, a sampling clock control unit 200 and a sampling clock generation unit 300. The deserialization unit 100 is configured to receive sampling clock signals, sample a plurality of input data signals, and generate a plurality of internal data signals. The sampling clock control unit 200 is configured to generate a delay control signal and a synchronization completion signal in response to the plurality of internal data signals and a first group of clock signals. The sampling clock generation unit 300 delays the first group of clock signals and provides the delayed first group of clock signals as the sampling clock signals in response to the delay control signal, and provides a second group of clock signals having a phase leading by a predetermined amount with respect to the first group of clock signals, as the sampling clock signals in response to the synchronization completion signal.

Examples of the semiconductor memory device 1350 include, but are not limited to, dynamic random access memory, static random access memory, synchronous dynamic random access memory (SDRAM), synchronous graphics random access memory (SGRAM), double data rate dynamic ram (DDR), and double data rate SDRAM.

The memory controller 1200 is used in the design of memory devices, processors, and computer systems. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented A chipset 1150 may be electrically coupled to the CPU 1100. The chipset 1150 is a communication pathway for signals between the CPU 1100 and other components of the system 1000, which may include the memory controller 1200, an input/output ("I/O") bus 1250, and a disk drive controller 1300. Depending on the configuration of the system 1000, any one of a number of different signals may be transmitted through the chipset 1150, and those skilled in the art will appreciate that the routing of the signals throughout the system 1000 can be readily adjusted without changing the underlying nature of the system.

As stated above, the memory controller 1200 may be electrically coupled to the chipset 1150. The memory controller 1200 can receive a request provided from the CPU 1100, through the chipset 1150. In alternate embodiments, the memory controller 1200 may be integrated into the chipset 1150. The memory controller 1200 may be electrically coupled to one or more memory devices 1350. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may be electrically coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. Further, the I/O bus 1250 may be integrated into the chipset 1150.

The disk drive controller 1450 may also be electrically coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

The system 1000 described above in relation to FIG. 7 is merely one example of a system employing a semiconductor memory device 1350. In alternate embodiments, such as cellular phones or digital cameras, the components may differ from the embodiment shown in FIG. 5.

While certain embodiments have been described above, it will be understood to those skilled in the art that the embodiments described are by way of example only. Accordingly, the receiver circuit, semiconductor apparatus and system including the same described herein should not be limited based on the described embodiments. Rather, the receiver circuit, semiconductor apparatus and system including the same described herein should only be limited in light of the claims that follow when taken in conjunction with the above description and accompanying drawings.

What is claimed is:

1. A receiver circuit comprising:
   a deserialization unit configured to receive sampling clock signals, sample a plurality of input data signals, and generate a plurality of internal data signals;
   a sampling clock control unit configured to generate a delay control signal and a synchronization completion signal in response to the plurality of internal data signals and a first group of clock signals; and
   a sampling clock generation unit configured to delay the first group of clock signals and provide the delayed first group of clock signals as the sampling clock signals in response to the delay control signal, and configured to provide a second group of clock signals having a phase leading by a predetermined amount with respect to the phase of the first group of clock signals as the sampling clock signals in response to the synchronization completion signal.

2. The receiver circuit of claim 1, wherein the sampling clock control unit comprises:
   a synchronization detection unit configured to generate the synchronization completion signal by detecting levels of the plurality of internal data signals; and
   a delay control unit configured to generate the delay control signal in response to the first group of clock signals until the synchronization completion signal is enabled.

3. The receiver circuit of claim 2, wherein when one of the plurality of input data signals has a high level, the synchronization detection unit enables the synchronization completion signal when the plurality of internal data signals have a low level.

4. The receiver circuit of claim 1, wherein the sampling clock generation unit comprises a delay selection unit configured to delay the first group of clock signals by an amount of a unit time period in response to the delay control signal, and provide one of the delayed first group of clock signals and the second group of clock signals as the sampling clock signals in response to the synchronization completion signal.

5. The receiver circuit of claim 4, wherein the sampling clock generation unit further comprises a phase interpolation unit configured to generate the second group of clock signals based on the first group of clock signals.

6. The receiver circuit of claim 4, wherein the delay selection unit comprises:
   a delay unit configured to generate a delayed first group of clock signals, that are sequentially delayed by an amount of a unit time period in response to the delay control signal; and
   a multiplexer configured to provide one of the output of the delay unit and the second group of clock signals as the sampling clock signals in response to the synchronization completion signal.

7. The receiver circuit of claim 1, wherein the predetermined amount of phase corresponds to one half of a window of the plurality of input data signals.

8. A method for correcting a skew in a semiconductor apparatus comprising:
   at a deserialization unit, receiving a first group of clock signals, sampling a plurality of input data signals, and generating a plurality of internal data signals;
   delaying the first group of clock signals and synchronizing edges of the plurality of input data signals with edges of the first group of clock signals in response to the plurality of internal data signals;
   providing a second group of clock signals having a phase leading by a predetermined amount with respect to the first group of clock signals, to the deserialization unit in response to the synchronization of the edges; and
   at the deserialization unit, receiving the second group of clock signals, sampling the plurality of input data signals, and generating the plurality of internal data signals.

9. The method for correcting a skew in a semiconductor apparatus in claim 8, wherein a clock signal is used to sample the a data signal according to an input order of the plurality of input data signals.

10. The method for correcting a skew in a semiconductor apparatus in claim 8, wherein one of the plurality of input data signals has a high level, and
    wherein the synchronizing the edges of the plurality of input data signals with the edges of the first group of clock signals delays the first group of clock signals until a synchronization completion signal is enabled, and generates the synchronization completion signal when the plurality of internal data signals sampled using the delayed first group of clock signals have a low level.

11. The method for correcting a skew in a semiconductor apparatus in claim 10, wherein the providing the second group of clock signals is performed in response to the synchronization completion signal.

12. The method for correcting a skew in a semiconductor apparatus in claim 8, wherein the predetermined amount of phase corresponds to one half of a window of the plurality of input data signals.

13. The method for correcting a skew in a semiconductor apparatus in claim 8, further comprising generating the second group of clock signals based on the first group of clock signals.

14. The method for correcting a skew in a semiconductor apparatus in claim 8, further comprising, at a master device, providing the plurality of input data signals having a predetermined pattern to the semiconductor apparatus during a training operation.

* * * * *